(12) United States Patent
Shepshelovich et al.

(10) Patent No.: US 8,186,616 B2
(45) Date of Patent: May 29, 2012

(54) HYBRID TRANSONIC-SUBSONIC AEROFOILS

(75) Inventors: Michael Shepshelovich, Ganey Tikva (IL); Moshe Steinbuch, Raanana (IL)

(73) Assignee: Israel Aerospace Industries Ltd., Lod (IL)

( * ) Notice: Subject to any disclaimer, the term of this patent is extended or adjusted under 35 U.S.C. 154(b) by 204 days.

(21) Appl. No.: 11/305,345

(22) Filed: Dec. 19, 2005

(65) Prior Publication Data

US 2006/0226283 A1    Oct. 12, 2006

Related U.S. Application Data

(60) Provisional application No. 60/637,464, filed on Dec. 21, 2004.

(51) Int. Cl.
*B64C 3/14* (2006.01)
*B64C 39/00* (2006.01)
*B64C 39/10* (2006.01)

(52) U.S. Cl. .................. 244/35 R; 244/45 R; 244/99.12

(58) Field of Classification Search .............. 244/10, 244/35 A, 35 R, 45 R, 99.11, 99.12, 130
See application file for complete search history.

(56) References Cited

U.S. PATENT DOCUMENTS

| | | | | |
|---|---|---|---|---|
| 3,952,971 A | * | 4/1976 | Whitcomb | 244/35 R |
| 4,050,651 A | * | 9/1977 | Neal et al. | 244/15 |
| 4,072,282 A | * | 2/1978 | Fulker et al. | 244/35 R |
| 4,387,869 A | * | 6/1983 | Englar et al. | 244/207 |
| 4,412,664 A | * | 11/1983 | Noonan | 244/35 R |
| 4,413,796 A | * | 11/1983 | Bousquet | 244/35 R |
| 4,455,003 A | * | 6/1984 | Hilbig | 244/35 R |
| 4,498,646 A | * | 2/1985 | Proksch et al. | 244/35 R |
| 4,524,928 A | * | 6/1985 | Schmidt et al. | 244/35 R |
| 4,641,796 A | * | 2/1987 | Feifel | 244/35 R |
| 4,799,633 A | * | 1/1989 | Lahti et al. | 244/130 |
| 6,089,502 A | * | 7/2000 | Herrick et al. | 244/35 R |
| 6,834,830 B2 | * | 12/2004 | Fujino | 244/35 R |

OTHER PUBLICATIONS

Harris, Charles D., "NASA Supercritical Airfolis," NASA Technical Paper 2969 (1990).
McGhee et al., "Low-Speed Aerodynamic Characteristics of a 17-Percent-Thick Airfoil Section Designed for General Avation Applications," NASA Technical Note D-7428 (1973).
Hicks et al., "Effects of Upper Surface Modification on the Aerodynamic Characteristics of the NACA 63(2)-215 Airfoil Section," NASA Technical Memorandum 78503 (1979).
Steinbuch, et al., "Development of UAV Wings Transonic Designs", 43rd Aerospace Sciences Meeting & Exhibit, Jan. 10-13, 2005, Reno, Nevada, AIAA 2005-0042, 13 pages, American Institute of Aeronautics and Astronautics.
Shepshelovich, "UAV Wing Design—a New Challenge", International Seminar—AERO India 2005, Bangalore, India, Feb. 7-9, 2005, 23 pages, Engineering Center, Israel Aircraft Industries, Ben-Gurion International Airport, Israel, 70100.
McGhee, et al., "Wind-Tunnel Results for a Modified 17-Percent-Thick Low-Speed Airfoil Section", NACA Technical Paper 1919, 86 pages total, (1981).

\* cited by examiner

*Primary Examiner* — Timothy D Collins
*Assistant Examiner* — Philip J Bonzell
(74) *Attorney, Agent, or Firm* — The Nath Law Group

(57) ABSTRACT

A hybrid transonic-subsonic airfoil is provided that combines subsonic and transonic features for achieving simultaneously acceptable aerodynamic characteristics at low subsonic and high transonic Mach numbers.

28 Claims, 5 Drawing Sheets

HYBRID TRANSONIC-SUBSONIC AEROFOILS

This application claims the benefit of prior U.S. provisional patent application No. 60/637,464 filed Dec. 21, 2004, the contents of which are hereby incorporated by reference in their entirety.

FIELD OF THE INVENTION

This invention relates to aerofoils, to wings based on such aerofoils, and to air vehicles comprising such wings or aerofoils.

BACKGROUND OF THE INVENTION

There is a well known basic conflict between efficient transonic flight of high-speed air vehicles and requirement for high-lift performance at subsonic speeds. Essentially there exist some basic differences in the aerodynamics associated with transonic and subsonic Mach numbers, and in the resulting pressure distributions on wing sections at the different flight regimes.

At transonic speeds, there is a general tendency for premature formation of shock waves on the upper surface of airfoils and for the development of shock-induced boundary layer separation. The resulting drag penalties and limitations on available lift (buffet and maximum lift limits) adversely affect the performance of the aircraft and constrain the allowable lift envelope. A classical solution for this problem generally adopted in the design and development of transonic cruise wings is a combination of wing sweepback and supercritical wing sections. Wing sweepback reduces the effective Mach number of transonic flight over the aerofoils, while the supercritical airfoil profiles prevent excessive flow acceleration on the upper surface thereof, producing favorable pressure distributions and reducing the wave drag penalties typically associated with subsonic aerofoils. Principles of supercritical design methodology are disclosed in NASA report Charles D. Harris, "NASA Supercritical Airfoils", NASA Technical Paper 2969, 1990, the contents of which are incorporated herein in their entirety, and FIG. 5 thereof on page 41 illustrates graphically the qualitative differences on the flow and pressure distributions between subsonic and supercritical (transonic) aerofoils at transonic Mach Nos. of between 0.7 and 0.8.

As disclosed in the aforementioned NASA report, transonic pressure distributions over transonic aerofoils show fast flow acceleration at the leading edge of the airfoil, followed by the "roof-top" or plateau pressure distribution above the critical value of pressure coefficient ($C_p$*), followed by relatively weak shock wave and aft-loaded aft portion of the airfoil. Controlling the transonically shaped thickness distribution along the chord of the aerofoil section and the camber distribution allows the airfoil pressure distributions and location of shock wave for such transonic aerofoils to be controlled when designing a transonic aerofoil. Camber distributions for supercritical aerofoils are characterized in having very low camber (much less than 0.5% camber) at the forward portion of the airfoil, followed by a relatively higher cambered (around 1 or 2% typically), "cusped" aft portion that controls the lift of the airfoil). However, as is well known, this type of camber distribution, while being beneficial at transonic Mach numbers nevertheless generates a sharp suction peak at subsonic Mach numbers, which in turn triggers premature flow separation, particularly with increases in angle of attack, and limits the lift-carrying capabilities of supercritical airfoils at subsonic Mach numbers.

For civil aircraft applications, this basic incompatibility problem is solved by integration of sophisticated, leading and trailing edge high-lift devices in a wing that is designed for transonic cruise. Nevertheless, this solution is not always desirable, being mechanically complex, and carrying associated cost and maintenance elements, rendering it unsuitable for many applications, including, for example, UAV applications.

At subsonic Mach numbers, high values of maximum lift of single-element airfoils may be achieved for traditional subsonic aerofoil designs, which are characterized in having drooped and blunt leading edges, i.e., relatively large cambers, leading edge radii and wing thickness close to the leading edge. As is well known, at subsonic flight conditions, increased thickness and increased local radius at the forward portion of the airfoil generally prevent premature formation of a suction peak with increase in angle of attack and also delays flow separation from the upper surface of the airfoil, improving subsonic maximum lift. Typical examples of implementation of the concept of blunt leading edge are described in the following references: McGhee, R. J. and Beasley, W. D., "Low-Speed Aerodynamic Characteristics of a 17-Persent-Thick Medium-Speed Airfoil Designed for General Aviation Applications", *NACA Technical Paper* 1786, 1980; Hicks, R. M. and Schairer, E. T., "Effects of Upper Surface Modification on the Aerodynamic Characteristics of the NACA $63_2$-215 Airfoil Section", *NASA TM*78503, 1979. However, high-lift subsonic airfoils are unsuitable and cannot operate at medium and high transonic Mach numbers because of premature formation of shock waves on their upper and lower surfaces, and the resulting fast deterioration of their lift-carrying capabilities with increasing Mach numbers.

Thus, the known groups of single-element, high-lift airfoils target a specific range of Mach numbers for their best lift performance, compromising on characteristics at off-design flight conditions. This is illustrated schematically in FIG. 1, showing typical lift domains of high-lift, low speed airfoils A1 and transonic aerofoils A2.

SUMMARY OF THE INVENTION

The present invention is directed to a hybrid aerofoil profiled for transonic and subsonic flight conditions, and comprising:

an upstream portion having a profile generally characteristic of subsonic aerofoils; and a downstream portion including a mid-portion having a profile generally characteristic of transonic aerofoils.

The aerofoil comprises a leading edge radius comparatively larger than that of a reference transonic aerofoil. The upstream portion may comprise a leading edge radius of greater than about 1.5%, or greater than about 2%, or greater than about 2.5%, or greater than about 3%, or greater than about 3.5%, or greater than about 4%, or greater than about 4.5%, or greater than about 5%, of the dimension of a chord of said aerofoil.

The aerofoil may comprise a smooth cross-sectional area distribution having a maximum value at a mid-portion of said aerofoil greater than 30%, or greater than 40%, or greater than 50%, or greater than 60%, or greater than 70%, of the dimension of chord of said aerofoil from a leading edge of the aerofoil.

The aerofoil may comprise a camber greater than 0.5%, or greater than 1%, or greater than 1.5%, or greater than 2%, of the dimension of a chord thereof between about 5% and about 30% of said chord from a leading edge of the aerofoil.

The aerofoil may comprise a camber substantially less than about 5% of a dimension of a chord thereof between about 30% and about 60% of said chord from a leading edge of the aerofoil.

The aerofoil may comprise a camber substantially more than about 1%, or more than about 1.5%, or more than about 2% of a chord thereof between about 30% and about 60% of said chord from a leading edge of the aerofoil.

The aerofoil may comprise a thickness comparatively thicker than a reference transonic aerofoil between about 1% of a chord thereof and about 5% of said chord from a leading edge of the aerofoil.

The aerofoil may comprise a camber distribution that is substantially intermediate to that obtained with a reference transonic aerofoil and that obtained with a reference subsonic aerofoil.

The said downstream portion may include a mid-portion that is shaped for delaying formation of shockwaves and minimizing wave drag at transonic Mach numbers. The said mid-portion may be defined as lying between from about 25% and about 60% of a chord of the aerofoil from the leading edge thereof.

The said downstream portion may include an aft portion that is shaped for controlling lift and pitching moment. The said aft portion may comprise a moveable control surface. The said aft portion may be defined as lying between about 60% and about 100% of a chord of the aerofoil from the leading edge thereof.

The aerofoil may comprise an area distribution along a chord thereof, and wherein said aerofoil comprises a location of maximum thickness, such that to allow a portion of the aerofoil downstream of said location for turbulent pressure recovery.

The aerofoil may define a substantially continuous geometric enclosure extending between a leading edge and a trialing edge thereof, for at least one flight condition.

The present invention is also directed to a hybrid aerofoil profiled for transonic and subsonic flight conditions, comprising:
an upstream portion having a profile configured for providing subsonic-like aerodynamic performance; and
a downstream portion including a mid-portion having a profile configured for providing transonic-like aerodynamic performance.

The aerofoil may be configured for providing a pressure distribution at a transonic design point thereof that is generally more favorable that obtained with a reference subsonic aerofoil, at said transonic design point.

The aerofoil may be configured for providing a pressure distribution at a subsonic design point that is generally more favorable than that obtained with a reference transonic aerofoil at said subsonic design point.

The said upstream portion may be profiled such as to reduce a magnitude of a suction peak and retarding development of trailing edge flow separation at subsonic flight conditions as compared with that obtained with a reference transonic aerofoil.

The said downstream portion may include a mid-portion that is shaped for delaying formation of shockwaves and minimizing wave drag at transonic Mach numbers, as compared with that of a reference subsonic aerofoil.

The invention is also directed to a wing for an aircraft having an aerofoil as defined herein, and to an aircraft comprising a wing having an aerofoil as defined herein.

The present invention is also directed to a method for profiling a hybrid aerofoil for transonic and subsonic flight conditions, comprising:
(a) profiling an upstream portion thereof such as to provide subsonic-like performance at a subsonic design point; and
(b) profiling a downstream portion thereof such as to provide transonic-like performance at a transonic design point.

Subsonic-like performance relates to the hybrid aerofoil having aerodynamic characteristics generally understood to be of the type or similar to those obtained with subsonic aerofoils, or at least different from classic aerodynamic characteristics obtained with transonic aerofoils at subsonic conditions, in particular a subsonic design point.

Transonic-like performance relates to the hybrid aerofoil having aerodynamic characteristics generally understood to be of the type or similar to those obtained with transonic aerofoils, or at least different from classic aerodynamic characteristics obtained with subsonic aerofoils at transonic conditions, in particular a transonic design point.

Step (a) may comprise generating a rounded leading edge having a radius substantially greater than 1.5%, or greater than about 2%, or greater than about 2.5%, or greater than about 3%, or greater than about 3.5%, or greater than about 4%, or greater than about 4.5%, or greater than about 5%, of the dimension of a chord of said aerofoil.

Step (b) may comprise providing a smooth cross-sectional distribution for the aerofoil having a maximum value at a mid-portion of said aerofoil greater than 30%, or greater than 40%, or greater than 50%, or greater than 60%, of a dimension of chord of said aerofoil from a leading edge of the aerofoil.

Steps (a) and (b) may be applied to a starting aerodynamic profile obtained for a reference subsonic aerofoil, or alternatively to a starting aerodynamic profile obtained for a reference transonic aerofoil.

Thus, in accordance with present invention, there is provided a single-element, double element or multi element, hybrid transonic-subsonic airfoil that combines subsonic and transonic features for achieving simultaneously acceptable aerodynamic characteristics at low subsonic and high transonic Mach numbers.

According to the invention, the forward portion of the airfoil is configured for subsonic speeds, and comprises a relatively blunt or rounded leading edge for enhancement of subsonic maximum lift, which results in delaying the formation of a suction peak and the development of trailing edge separation. A mid-portion of the airfoil is shaped for minimization of wave drag at transonic flight conditions, followed by auxiliary aft-portion for control of lift and pitching moment and for integration with optional trailing edge high-lift devices. The invention combines simplicity of single-element airfoils with capabilities to provide improved values of maximum lift at subsonic speeds, while retaining extended transonic characteristics. The combination of purely subsonic design feature at the leading edge with transonic shaping of the mid portion and/or aft portion of the airfoil contours is in contrast with both standard supercritical design technology and design methodology of subsonic high-lift airfoils.

Hybrid airfoils according to the invention may be considered attractive, for example, for development of simple, high-speed UAU wings also capable of achieving improved lift performance at subsonic speeds, while complying with requirements of transonic cruise flight and enhanced maneuver capabilities at medium transonic Mach numbers. However, the hybrid aerofoil concept of the invention are also applicable to many non-UAV applications, for example to the development of simple transonic wings for civil aircraft applications, improving their subsonic performance and efficiency of trailing-edge high-lift devices, while minimizing the mechanical complexity and manufacturing/maintenance costs.

Hybrid transonic-subsonic airfoils according to the invention may be used as the basis for the design and development of simple transonic wings with extended flight envelope, improved subsonic/transonic performance and enhanced maneuver capabilities, as applied to UAV's or any other suitable manned or unmanned aircraft.

Herein, the term "suction peak" relates to the spiked pressure distribution on the upper surface that is sometimes generated due to fast flow acceleration at the leading edge of an airfoil, typically when the leading edge has a relatively small radius and/or as the angle of attack is increased. For high lift subsonic aerofoils, formation of a suction peak at the leading edge, for example due to low camber and/or small leading edge radius, is of primary concern because of its effect on lift-carrying capabilities. Similarly, transonic aerofoils can also suffer performance penalties at subsonic conditions due to suction peaks generated.

Herein, "transonic shaping" refers to area ruling of the thickness distribution or cross-sectional area distribution along the chord of the airfoil, designed for generating a favorable pressure distribution at transonic Mach numbers and prevention of formation of strong shock waves at design lift coefficient, so as to minimize wave drag and for aft location of shock wave. Typically, such area ruling provides a smoothly increasing area distribution along a mid-portion of the chord, reaching a maximum area associated with formation of the shock wave. It should be noted that there may be some qualitative similarity between thickness distribution of transonic airfoils and wing sections designed solely by means of NLF (natural laminar flow) techniques.

By "datum transonic aerofoil" or "reference transonic aerofoil" is meant a transonic aerofoil designed using conventional design technologies/methods for transonic aerofoils (e.g. conventional transonic supercritical technologies and/or NLF design methodologies), or chosen from existing transonic aerofoil designs at the same or similar conditions as the transonic design point of the hybrid aerofoil of the invention. That is to say, at the same or similar Mach number, design lift coefficient, and possibly at the same or similar Reynolds number, and having the same or similar thickness/chord ratio as for the transonic design point of the hybrid aerofoil.

By "datum subsonic aerofoil" or "reference subsonic aerofoil" is meant a subsonic aerofoil designed using conventional design technologies/methods for subsonic aerofoils, or chosen from existing subsonic aerofoil designs, such as for example NACA subsonic aerofoils, at the same or similar flight conditions as the subsonic design point of the hybrid aerofoil. That is to say, at the same or similar Mach number, design lift coefficient, and possibly at the same or similar Reynolds number, and having the same or similar thickness/chord ratio as for a subsonic design point of the hybrid aerofoil.

Thus, according to the invention, a method is provided for designing a hybrid subsonic-transonic aerofoil section, in which a basic subsonically-designed aerofoil may be modified, in particular the mid-portion thereof according to transonic design rules or procedures, such that the resulting aerofoil has improved transonic performance over the original subsonic aerofoil, while maintaining, improving, or in some cases suffering a small loss in subsonic performance.

Also, according to the invention, a method is provided for designing a hybrid subsonic-transonic aerofoil section, in which a basic transonically-designed aerofoil is modified, in particular the upstream portion thereof according to subsonic design rules or procedures, such that the resulting aerofoil has improved subsonic performance over the original transonic aerofoil, while maintaining, improving, or in some cases suffering a small loss in transonic performance.

According to the invention, for cambered hybrid aerofoils, the camber level at the upstream part of the aerofoil will tend to be the same, for a particular subsonic design point, regardless of whether a high lift or low lift transonic design point is being considered, since an aim is to suppress possible leading edge suction peak, and to achieve high subsonic maximum lift regardless of the transonic design lift coefficient. On the other hand, the camber of such an aerofoil, when the transonic design point is for low lift, the subsequent camber distribution will be comparatively lower than for when the transonic design point is for high lift. Thus, the transonic design lift coefficient influences the camber level of the hybrid aerofoil at the mid and aft portion thereof. Thus, cambered hybrid aerofoils have a camber level at an upstream portion that is generally greater than that of a reference transonic aerofoil, while the level of camber for the downstream portion is generally adjusted to match the design lift coefficient.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF EMBODIMENTS

Figure 1:
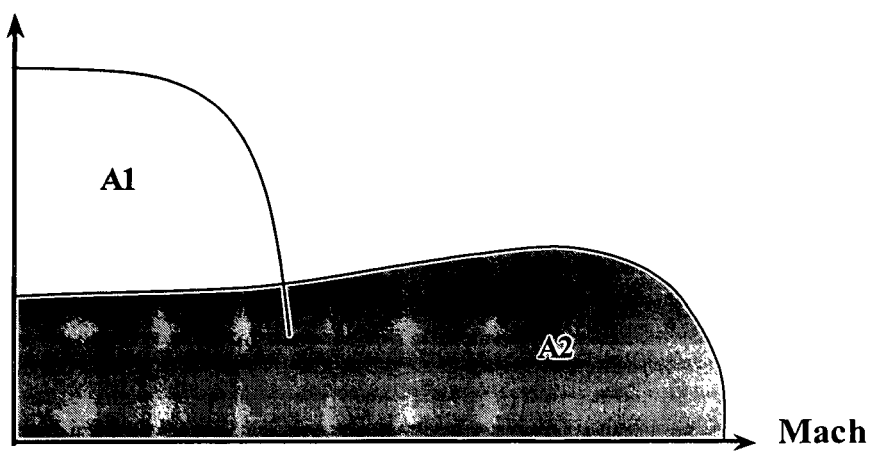
FIG. 1 is a schematic representation of subsonic and transonic regimes of prior art subsonic and transonic aerofoils.
Figure 2:
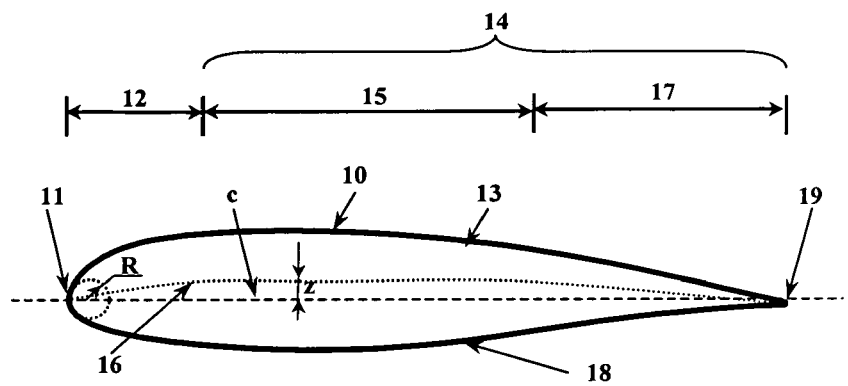
FIG. 2 illustrates schematically a hybrid aerofoil according to one embodiment of the invention.

As will become clearer herein, and referring to FIG. 2, a hybrid aerofoil 10 according to the invention comprises a first upstream section 12 comprising the leading edge 11, and a second downstream section 14 comprising a mid-portion 15 and a trailing portion 17 of the aerofoil, including the trailing edge 19. In this embodiment, the aerofoil 10 is a single element aerofoil, that is to say, the aerofoil defines a nominally closed and continuous geometric contour between the leading edge 11 and trailing edge 19. By nominally closed and continuous contour is meant that, while the aerofoil may optionally comprise variable geometry and/or deployable aerodynamic components, e.g., air breaks, leading edge flaps, trailing edge slats, ailerons, and so on, there is at least one flight condition for the aerofoil when all such components are retracted and/or in a neutral position, such that each of the paths along the upper side 13 and lower side 18 of the aerofoil, from the leading edge 11 to the trailing edge 19, is substantially continuous.

The present invention is also applicable to other types of aerofoils, for example two-element aerofoils such as permanently slotted aerofoils, in which the flow path along the upper and lower sides of the aerofoil is always interrupted by the slot, or to multi-element aerofoils, in a similar manner to that described herein for single element aerofoils, mutatis mutandis.

For the sake of simplicity, the first part 12 can be considered to extend between 0% and about 25% or about 30% of the chord c from the leading edge 11, while the mid portion 15 extends from about 25% or 30% of the chord c to about 70% or up to 90% of the chord c. The trailing part 17 extends from the mid portion 15 to the trailing edge 19. The contour of the aerofoil between the first part 12 and the second part 14 is continuous, as is between the mid portion and the trailing part 17, along the upper side 13 and along the lower side 18. These ranges for the first part 12 and second part 14, including the mid portion 15 and trailing part 17, are merely illustrative, and are not intended to limit the hybrid aerofoil of the invention.

The trailing part 17, or aft portion of the aerofoil, may comprise a moveable or actuable control surface, which can act as air breaks, trailing edge flaps, ailerons, and so on.

According to the invention, the hybrid aerofoil 10 is configured such that the first section 12 thereof, including the leading edge 11, provides a profile suited to subsonic flight conditions, while a second section 14, in particular a mid-portion 15 of the aerofoil, provides a profile suited to transonic flight conditions.

Said differently, the first section 12 can be defined or considered as the forward or upstream portion of the aerofoil having a profile derived from or leaning towards a subsonic aerofoil design, and where it is intended to provide good, acceptable, reasonable or optimal subsonic performance, while not unduly degrading transonic performance, whereas as least the mid portion 15 of the second section 14 can be defined or considered as the aft or downstream portion of the aerofoil having a profile derived from or leaning towards a transonic aerofoil design and where it is intended to provide good, acceptable, reasonable or optimal transonic performance, while not unduly degrading subsonic performance.

Further, and in contrast to subsonic or transonic aerofoils, hybrid aerofoils according to the invention are designed or created with two design points in mind: a transonic design point and a subsonic design point. For the subsonic design point, the design Mach number, thickness chord ratio, and design lift coefficient are chosen according to the requirements of the aircraft. The second design point is at a design transonic mach number, at the same thickness/chord ratio as before, and the design lift coefficient for this design point may be low lift or high lift, depending on the configuration of the air vehicle and/or the mission profile.

According to the invention, these two design points may be fixed before the design process is commenced, or alternatively, one design point may be fixed, while having a "floating" second design point, in which the actual parameters thereof may be within a range of values, for example. For example, a hybrid aerofoil according to the invention may have a fixed transonic design point, in which the design lift coefficient, Mach number and thickness/chord ratio are fixed, and wherein the a design lift coefficient between a particular range is targeted for a subsonic Mach number. In such a case, the subsonic design lift coefficient may be the best possible that can be obtained at that Mach number, for example, or alternatively, if the subsonic design lift coefficient is less than required, then the hybrid aerofoil can be further modified to arrive at an acceptable subsonic design lift coefficient.

Figure 3:
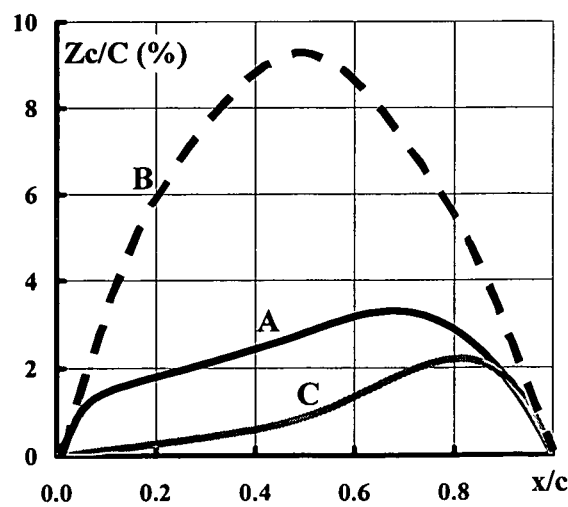
FIG. 3 compares the camber distribution of the aerofoil of FIG. 2 with corresponding camber distributions of subsonic and transonic aerofoils.

The aerofoil 10 of this embodiment comprises a camber line 16 which is represented in FIG. 3 in a non-dimensional manner as percentage deviation of the camber line 16 from the chord c as a function of non-dimensional distance along the chord, x/c. For comparison, the typical corresponding camber distributions that may be obtained with a reference subsonic aerofoil and a reference transonic aerofoil are also provided in FIG. 3. As exemplified by this figure, the camber distribution A of the hybrid aerofoil 10 is somewhere intermediate between the camber distributions B and C of corresponding subsonic and transonic aerofoils, respectively.

As exemplified in FIG. 3, the camber distribution B of a typical subsonic aerofoil is characterized by a steeply increasing camber, which by way of example the may rise from about 2% to about 10% between x/c of 5% to 40%, respectively, and then smoothly decreases towards the trailing edge. The camber distribution C of a typical transonic aerofoil, on the other hand, is characterized in having a close to zero camber distribution, usually much less than 1% Z/c, less than 0.5%, or even less than 0.2% for the first section of the aerofoil (indeed, up to the first 40%-50% of the chord (x/c) is not unusual). From about mid-chord to at or near the trailing part 17 of the aerofoil, the camber increases modestly, though usually to no more than about 2% Z/c, sharply decreasing thereafter towards the trailing edge.

The hybrid aerofoil 10 has a camber distribution A which, at the upstream first part 12, increases with distance along the chord such that the for x/c between about 1% and about 25% the camber may be substantially higher than 0.5% or higher than 1%. The actual camber distribution for this part of the cambered aerofoil may vary according to subsonic design lift coefficient and priorities given to the subsonic lift characteristics, but remains higher than would be expected with a transonic aerofoil, while not typically approaching the very high cambers of high lift subsonic aerofoils. In general, the camber distribution of a cambered hybrid aerofoil according to the invention is substantially lower than that of a corresponding reference subsonic aerofoil, while substantially higher than that of a corresponding reference transonic aerofoil, at least within the range of x/c between about 1 or 2% and about 95 or 98%.

Furthermore, in addition to, or in alternative to, the camber distribution disclosed above for the hybrid aerofoil, the first part 12, and in particular the leading edge 11 of the aerofoil may comprise a profile that is substantially more rounded or blunt, having a larger leading edge radius R and being thicker in section, than would be expected with a transonic aerofoil of the same chord and maximum thickness, and these features can provide the hybrid aerofoil with improved performance at subsonic flight conditions with respect to such transonic aerofoils, even at elevated angles of attack. At the same time, the mid-portion 15, comprises a profile that is designed to minimize wave drag at transonic flight conditions, and suitable area ruling may be applied for so doing. However, since the profile of the mid-section merges with that of the first portion 12 in a smooth and discontinuity-free manner, the flow over the mid-portion will be affected by the upstream first portion 12. Thus, the transonic performance associated with the mid-portion 15 may be reduced in comparison with that of a transonic aerofoil, but at the same time will tend to be superior to that of a corresponding subsonic aerofoil. The trailing portion 17 of the hybrid aerofoil may be designed to provide required pitching moment, and may be designed using methods similar to those used for the design of subsonic or transonic aerofoils, it being understood that the profile of the trailing portion 17 merges with that of the mid-section 15 in a smooth and discontinuity-free manner.

Figure 4:
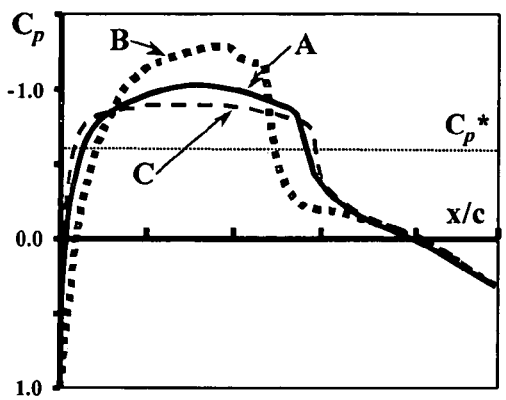
FIG. 4 compares the pressure coefficient distributions on the upper surface of the aerofoil of FIG. 2 with corresponding coefficient distributions of subsonic and transonic aerofoils at transonic flight conditions.

The pressure distribution that may be obtained with a hybrid aerofoil according to the invention for transonic flight conditions typically Mach number of about 0.5 to about 0.9 is exemplified at A in FIG. 4. As may be seen the pressure coefficient $C_p$ for the upper surface (full line) of the aerofoil rises rapidly along the chord, typically more steeply than for a subsonic aerofoil B, and reaches a plateau that, while lower than that of the subsonic distribution B, is a little higher than would be expected with a transonic aerofoil C of the critical $C_p$ (shown as $C_p^*$). Nevertheless, a milder shock wave downstream than the corresponding subsonic case B is produced, and thus provides flight performance comparable to a transonic aerofoil.

Figure 5:
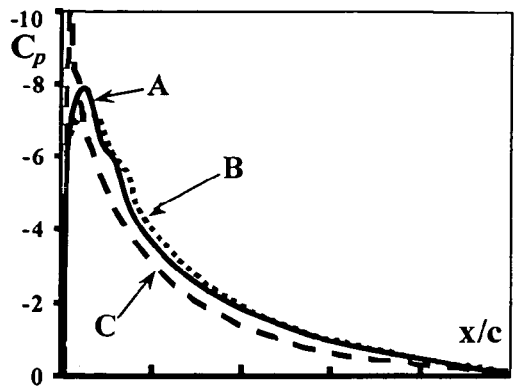
FIG. 5 compares the pressure coefficient distributions of the aerofoil of FIG. 2 with corresponding coefficient distributions of subsonic and transonic aerofoils at subsonic flight conditions.

The pressure distribution that may be obtained with a hybrid aerofoil according to the invention for subsonic flight conditions is exemplified at A in FIG. 5. The blunt leading edge and/or high camber of the hybrid aerofoil 10 relative to a transonic aerofoil provides subsonic-like performance at low Mach numbers conditions typically about 0.1 to about 0.4, though typically less than a corresponding reference subsonic aerofoil (shown at B).

Accordingly, it may be seen that a hybrid aerofoil 10 according to the invention provides adequate, if not optimum performance, both at the subsonic and transonic flight conditions. The design of any particular hybrid aerofoil according to the invention may be directed to provide better performance at one or another of the subsonic or transonic flight regime, at the expense of performance at the other flight regime, by correspondingly bringing the design of the first part 12 and second part 14 more in line with that of a subsonic or a transonic aerofoil, respectively. However, care is nevertheless taken to ensure that the performance obtained at the other flight regime is still superior to that of the corresponding transonic and subsonic aerofoil, respectively.

The geometrical closure that defines the contour of the hybrid aerofoil according to the invention may be evaluated for every specific design case, according to the design lift coefficient, required thickness, flight Reynolds numbers, required range of Mach numbers, etc., establishing each time the desired balance between transonic and subsonic aerodynamic characteristics according to design priorities.

Thus, the hybrid transonic-subsonic airfoil according to the invention seamlessly combines subsonic and transonic design features. Based on this design concept, families of hybrid airfoils may be designed, covering a wide range of subsonic and transonic Mach numbers and differing in design specifications (design lift coefficient, Mach/Reynolds numbers, pitching moment, thickness, etc.—the same as in the case of other known families of wing sections), and enabling full three-dimensional wings with corresponding subsonic and transonic aerodynamic characteristics to be designed.

A hybrid subsonic-transonic aerofoil according to the invention may be designed using any one of a number of different procedures. Some of these procedures will be described, and other aerofoil design procedures may be similarly modified, mutatis mutandis.

In one such design procedure, a hybrid aerofoil according to the invention may be designed based on a subsonic aerofoil design at or close to the subsonic design point of the hybrid aerofoil as a starting point of the design procedure.

Step 1—a corresponding subsonic aerofoil is designed in a manner known in the art, or alternatively may be chosen from suitable NACA aerofoils, for example, for the particular subsonic design point required for the hybrid aerofoil. The aerodynamic characteristics, for example $C_p$, $C_L$, $C_D$ for the aerofoil at the transonic and subsonic design points are then obtained, using any method as known in the art, for example.

Step 2—the profile of forward upstream portion of the aerofoil is modified, directly or indirectly, for example wherein the camber and/or thickness distribution of the first section is modified, while maintaining smoothness and continuity with the second section of the aerofoil such as to provide an improvement in the aerodynamic characteristics of the aerofoil at subsonic and/or at transonic design points.

Step 3—the mid portion of the aerofoil is modified to provide an improvement in aerodynamic characteristics at subsonic and/or at transonic design points, for example by applying areas ruling etc.

Step 4—step 2 and/or step 3 are repeated until a hybrid aerofoil profile is created having a particular balance of aerodynamic characteristics in both the subsonic and transonic flight conditions, wherein this balance provides at least minimum aerodynamic performance at both design conditions.

Step 4 may be repeated a number of times to provide a family of hybrid aerofoils that, while satisfying providing sufficient performance in both flight regimes, nevertheless provide a different balance between the two. For example, some such aerofoils may be more optimized for subsonic or for transonic flight conditions, while still providing reasonable performance at the other flight condition. The transonic design point may be fixed prior to staring the design process.

In another design procedure, a hybrid aerofoil according to the invention may be designed based on a transonic aerofoil design at or close to the transonic design point of the hybrid aerofoil as a starting point of the design procedure.

Step 1—a corresponding transonic aerofoil is designed in a manner known in the art, or alternatively may be chosen from suitable transonic aerofoils, for example, for the particular transonic design point required for the hybrid aerofoil. The aerodynamic characteristics, for example $C_p$, $C_L$, $C_D$ for the aerofoil at the transonic and subsonic design points are then obtained, using any method as known in the art, for example.

Step 2—the profile of forward upstream portion of the aerofoil is modified, directly or indirectly, for example wherein the camber and/or thickness distribution of the first section is modified, while maintaining smoothness and continuity with the second section of the aerofoil such as to provide an improvement in the aerodynamic characteristics of the aerofoil at subsonic and/or at transonic design points.

Step 3—the mid portion of the aerofoil is modified to provide an improvement in aerodynamic characteristics at subsonic and/or at transonic design points, for example by applying areas ruling etc.

Step 4—step 2 and/or step 3 are repeated until a hybrid aerofoil profile is created having a particular balance of aerodynamic characteristics in both the subsonic and transonic flight conditions, wherein this balance provides at least minimum aerodynamic performance at both design conditions.

Step 4 may be repeated a number of times to provide a family of hybrid aerofoils that, while satisfying providing sufficient performance in both flight regimes, nevertheless provide a different balance between the two. For example, some such aerofoils may be more optimized for subsonic or for transonic flight conditions, while still providing reasonable performance at the other flight condition. The transonic design point may be fixed prior to staring the design process.

A number of examples of hybrid aerofoils created or designed according to the invention will be described in relation to one or another datum (or reference) subsonic and transonic aerofoils.

EXAMPLE 1

Figure 6:
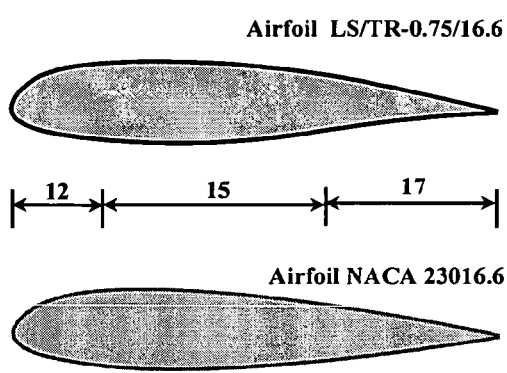
FIG. 6(a) compares the geometry of a particular hybrid aerofoil LS/TR-0.75/16.6 according to the invention, with a reference subsonic aerofoil NACA 23016.6, and FIG. 6(b) compares the camber distributions of the aerofoils of FIG. 6(a).
Figure 6:
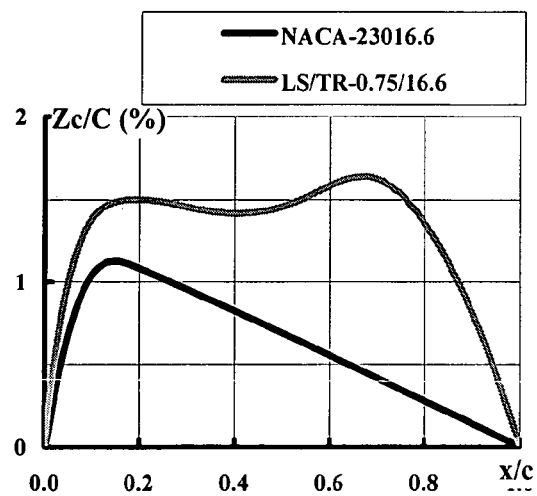

A low lift hybrid airfoil according to the invention is illustrated in FIG. 6(a), designated herein as LS/TR-0.75/16.6, and is geometrically compared with a subsonic airfoil NACA-23016.6 that was chosen as reference case for illustrating some aerodynamic features of the invention. FIG. 6(b) compares the camber distributions of the two aerofoils. The airfoil LS/TR-0.75/16.6 was designed for high transonic cruise Mach number of M=0.75, relatively small design lift coefficient of $C_l$=0.1, Reynolds Number Re=3.0*10$^6$, constrained pitching moment and maximum thickness of t/c$_{max}$=16.6%. The subsonic design point was not fully fixed, but rather allowed to float, such as to provide the best possible design lift coefficient (if possible, better than that of the NACA reference aerofoil) at a Mach number of about 0.1. The hybrid aerofoil LS/TR-0.75/16.6 was designed using NACA-23016.6 as a starting point, and using trial and error techniques for providing the requires aerodynamic performance at both design conditions.

Figure 7:
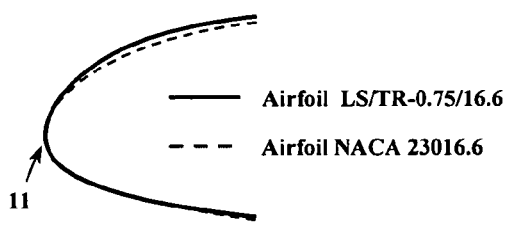
FIG. 7 superimposes the geometries of the aerofoils of FIG. 6.

The NACA-23016.6 aerofoil also comprises the same maximum thickness of t/c$_{max}$=16.6% as the hybrid aerofoil LS/TR-0.75/16.6. As illustrated in FIG. 7, referring to the first section 12 of the aerofoil, the hybrid aerofoil LS/TR-0.75/ 16.6 exhibits only a slightly more blunt profile, though almost identical profile at the leading edge 11 itself, as compared with the NACA-23016.6 aerofoil, which led to better performance even at subsonic conditions (see FIGS. 9(a) and 9(b)). (This indicates that aerofoil NACA-23016.6 may not be an optimal design profile for the subsonic design point contemplated.) However, the mid-portion 15 of the hybrid aerofoil LS/TR-0.75/16.6 exhibits characteristics of a transonic type aerofoil compared with the reference aerofoil NACA-23016.6.

Figure 8:
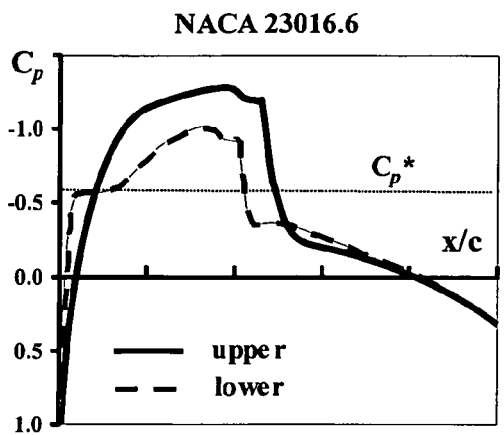
FIGS. 8(a) and 8(b) illustrate the pressure coefficient distributions obtained with hybrid aerofoil LS/TR-0.75/16.6 and reference subsonic aerofoil NACA 23016.6, respectively.
Figure 8:
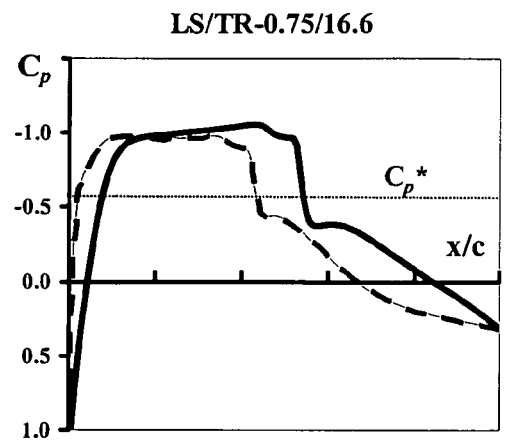
Figure 9:
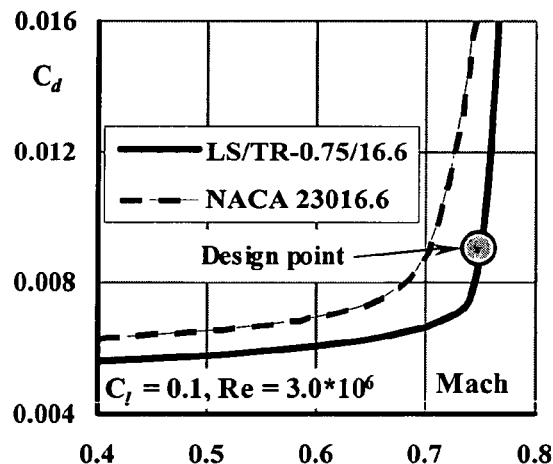
FIG. 9(a) compares Drag Coefficient vs. Mach number data, and FIG. 9(b) compares Lift Coefficient vs. angle of attack data, obtained for the aerofoils of FIG. 6.
Figure 9:
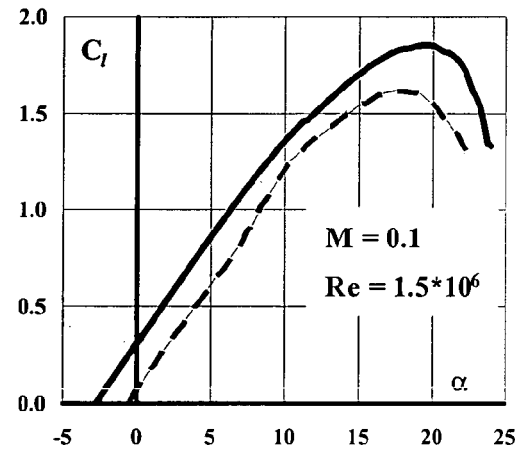

FIGS. 8(a) and 8(b) illustrate the comparative performance obtained with the hybrid aerofoil LS/TR-0.75/16.6 as compared with the reference aerofoil NACA-23016.6, expressed as pressure coefficient distributions over the upper and lower surfaces of the aerofoils at M=0.7, $C_L$=0.1, Re=3.0*10$^6$. It may be readily appreciated that the hybrid aerofoil LS/TR-0.75/16.6 has, on its upper surface, a sharper rise, a flatter, lower and more extended $C_p$ plateau, with a milder shockwave, than the NACA-23016.6 aerofoil, and similar features can be found for the lower surface. The variation of drag coefficient $C_D$ with Mach number M, illustrated in FIG. 9(a) shows significant improvements of the hybrid aerofoil LS/TR-0.75/16.6 over the NACA-23016.6 aerofoil, particularly at the higher Mach number range, for M>0.7. As illustrated in FIG. 9(b), the lift coefficient $C_L$ is also superior for a range of angles of attack α.

EXAMPLE 2

Figure 10:
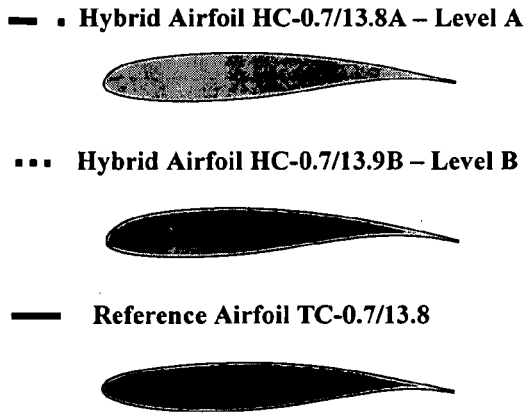
FIG. 10 compares the geometry of two particular hybrid aerofoils according to the invention, HC-0.7/13.8A (Level A), HC-0.7/13.9B (Level B), with a reference transonic aerofoil TC-0.7/13.8.

In this example, two high-lift, hybrid airfoils, designated as HC-0.7/13.8A and HC-0.7/13.9B, which differ one from the other in the relative bluntness of their leading edges, though more in their camber distributions, are illustrated in FIG. 10, compared with a datum or reference transonic aerofoil TC-07/13.8 that was specially designed for the same flight conditions. The transonic design point was set at M=0.7, design lift coefficient of 0.7, (Re=1.5*10$^6$), t/c=13.8%; the subsonic design point was set at Mach number of between about 0.1 and about 0.2, t/c=13.9%, with design lift coefficient left undefined, the design of the aerofoils being such as to maximize this parameter.

The reference transonic aerofoil TC-07/13.8 was designed using standard design methodology of transonic airfoils, in particular supercritical technology adjusted to incorporate the design principles of NLF (natural laminar flow airfoils) airfoils, for the design point M=0.7, design lift coefficient of 0.7, t/c=13.8%.

The hybrid airfoils HC-0.7/13.8A and HC-0.7/13.9B were designed based on the reference transonic aerofoil TC-07/ 13.8 as a starting point.

Figure 11:
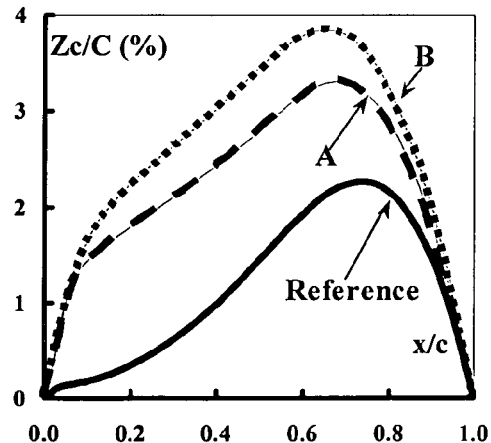
FIG. 11 compares the camber distributions obtained with the aerofoils of FIG. 10.
Figure 12:
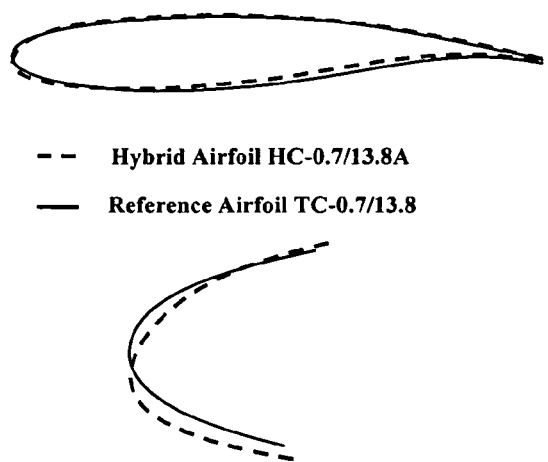
FIG. 12 superimposes the geometries of the aerofoil HC-0.7/13.8A and reference aerofoil TC-0.7/13.8.
Figure 13:
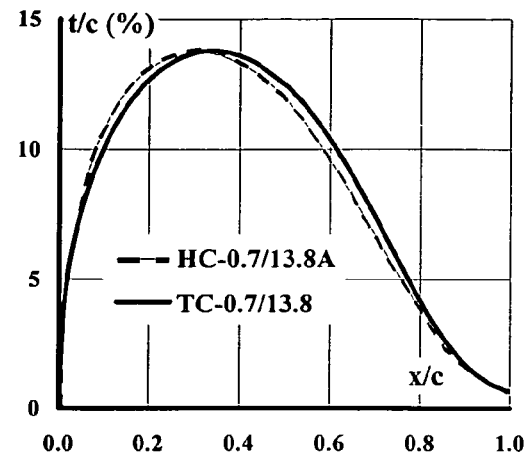
FIG. 13 superimposes the thickness distributions for the aerofoil HC-0.7/13.8A and reference aerofoil TC-0.7/13.8.

As may be seen form FIG. 11, the reference transonic TC-07/13.8 follows the standard design for cambered transonic aerofoils, which is characterized by low level of camber (tenths of percent) at the forward portion of the airfoil, followed by cambered ("cusped") aft portion having a camber peak of about 2% or so at between 60% to about 80% of the chord. On the other hand, the high lift hybrid aerofoils HC-0.7/13.8A and HC-0.7/13.8B, having subsonically matched leading edges, have substantially increased level of camber, that, depending on design lift coefficient, may exceed 1% at the forward 25% of airfoil chord, followed by increased level of camber at mid and aft portion of the airfoils. As illustrated in FIG. 12 and FIG. 13, the first hybrid aerofoil HC-0.7/13.8A has a higher thickness distribution and camber at the first section 12 of the aerofoil. Improved subsonic maximum lift of hybrid airfoils, compared to transonic aerofoils, may be attributed to such combinations of thickness distribution at the leading first section of the aerofoil and camber distribution thereat, that create the required bluntness or roundness of the leading edge of hybrid airfoils.

The mid-portion of the hybrid airfoils HC-0.7/13.8A and HC-0.7/13.8B were shaped in a transonic manner to minimize or prevent excessive flow acceleration above critical value of pressure coefficient ($C_p^*$), similar to the principles of supercritical design methodology. The designs also took into account a requirement for maintaining laminarization of the airfoil surfaces for as long as possible for minimization of friction drag, using known natural laminar flow (NLF) design methodologies. It is to be noted that extended laminarization may require thickness distribution along the chord of the airfoils that is similar to that required for transonic shaping of wing sections, and thus the same thickness achieved both goals.

Figure 14:
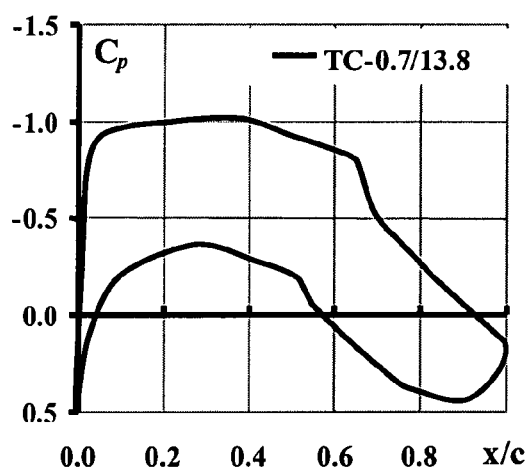
FIGS. 14(a) and 14(b) illustrate the pressure coefficient distributions obtained with hybrid aerofoils HC-0.7/13.8A, HC-0.7/13.9B and with reference subsonic aerofoil TC-0.7/13.8, respectively.
Figure 14:
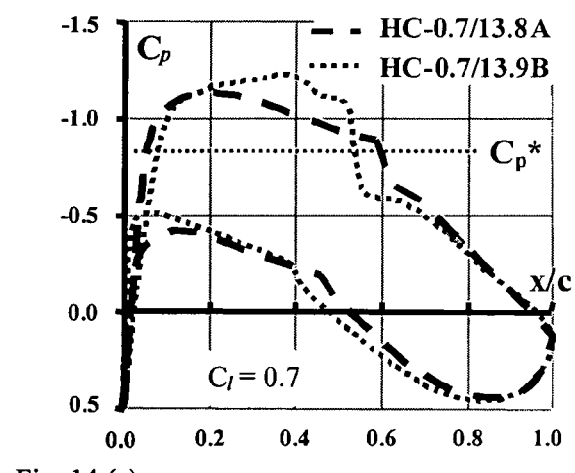

Pressure distributions of high-lift, hybrid airfoils are shown in FIG. 14(a) relative to the reference airfoil TC-0.7/13.8, FIG. 14(b), at M=0.7, $C_{L\ design}$=0.7, Re=1.5*10$^6$. The relatively blunt leading edge of the hybrid airfoils produce gradual flow acceleration at the forward portion of the airfoil in contrast to fast flow acceleration at the leading edge of supercritical airfoil.

Figure 15:
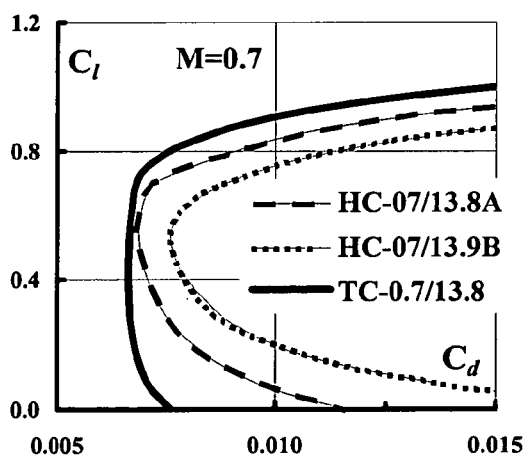
FIG. 15(a) illustrates drag polars obtained with the aerofoils of FIG. 10.
FIG. 15(b) effect of positive/negative deflections of trailing edge flap on drag polars of aerofoil HC-0.7/13.8A of FIG. 10.
Figure 15:
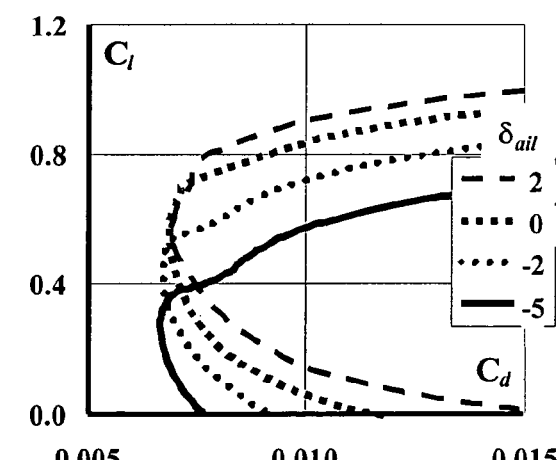

Transonic drag polars of the high-lift, hybrid airfoils are presented in FIG. 15(a) relative to the characteristics of reference airfoil. For this specific case, the minimum drag of hybrid airfoil HC-0.7/13.8A (M=0.7, $C_{l\ design}$=0.7) is similar to the reference case (the slight difference in drag may be explained by the extension of laminar flow on upper/lower surfaces of reference airfoil). As illustrated in FIG. 15(b), the width of low-drag bucket (range of lift coefficient values associated with the minimum drag coefficient) of the hybrid airfoil may be extended, if necessary, by small positive/negative deflections (in the figure ranging from about −5° to +2°) of trailing edge flap.

The drag polars obtained with hybrid airfoils HC-0.7/13.8A and HC-0.7/13.9B can serve to illustrate some of the limitations which may be present when trying to achieve a further improvement of subsonic characteristics by means of increasing the camber level of the aerofoil section. For this case, increasing the camber from that of hybrid airfoil HC-0.7/13.8A to that of hybrid airfoil HC-0.7/13.9B resulted in an improvement in maximum lift coefficient for subsonic Mach numbers (0.1 to about 0.3) and for mid-range Mach numbers (0.3 to about 0.5). However, the drag levels rose substantially for transonic Mach numbers, while the lift coefficient remained approximately constant (see FIGS. 15(a) and 16(a)).

Figure 16:
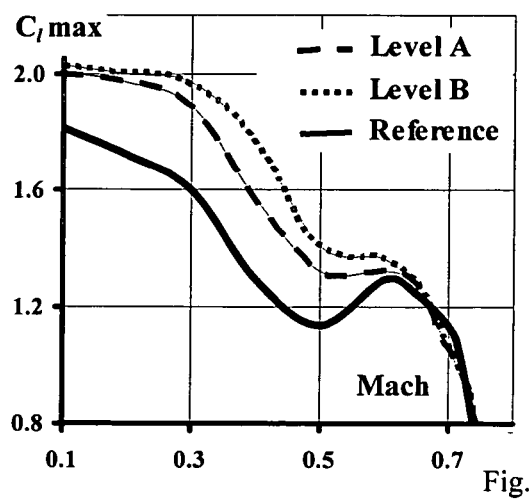
FIG. 16(a) compares maximum Lift Coefficient vs. Mach number data, and FIG. 16(b) compares Lift Coefficient vs. angle of attack data, obtained for the aerofoils of FIG. 10.
Figure 16:
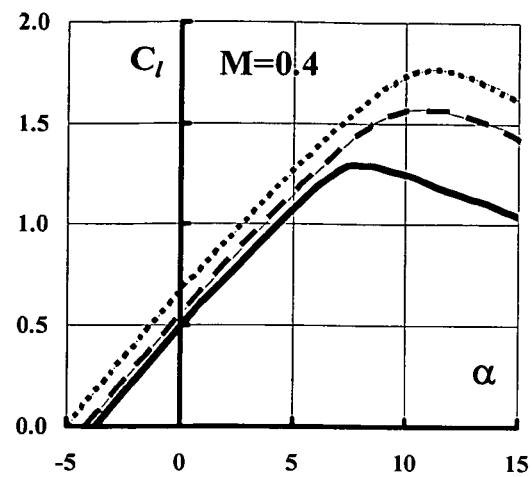
Figure 17:
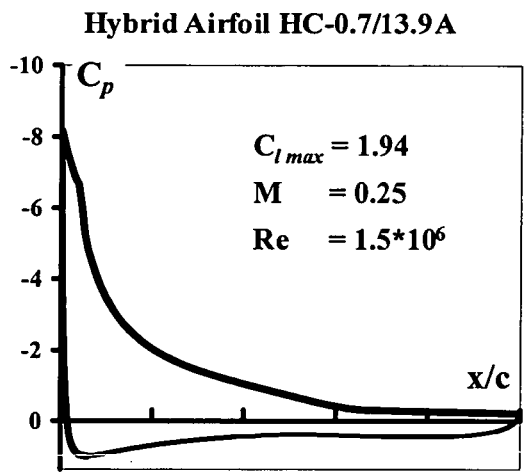
FIGS. 17(a) and 17(b) illustrate pressure coefficient distributions obtained for the reference aerofoil TC-0.7/13.8 and for the hybrid aerofoil HC-0.7/13.8A, respectively, at M=0.25.
Figure 17:
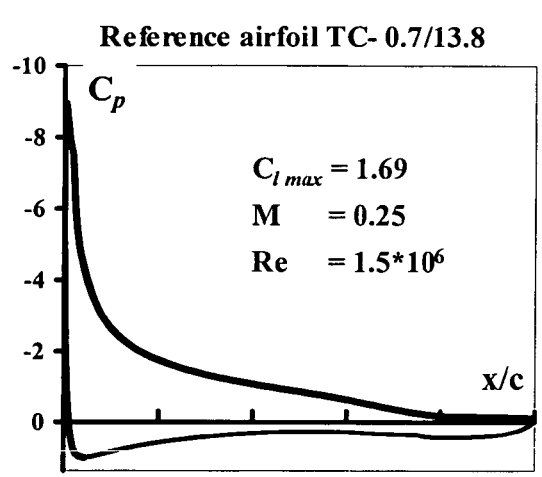
Figure 18:
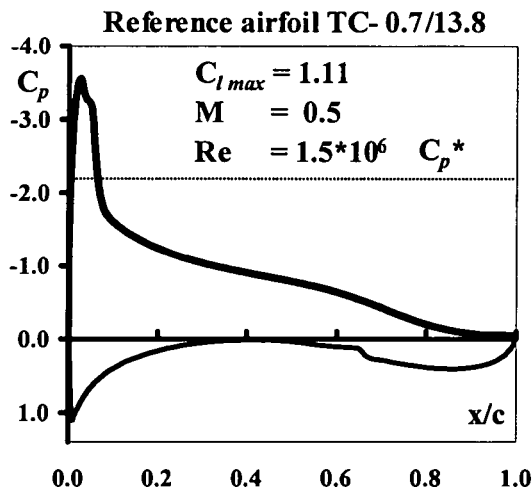
FIGS. 18(a) and 18(b) illustrate pressure coefficient distributions obtained for the reference aerofoil TC-0.7/13.8 and for the hybrid aerofoil HC-0.7/13.8A, respectively, at M=0.50.
Figure 18:
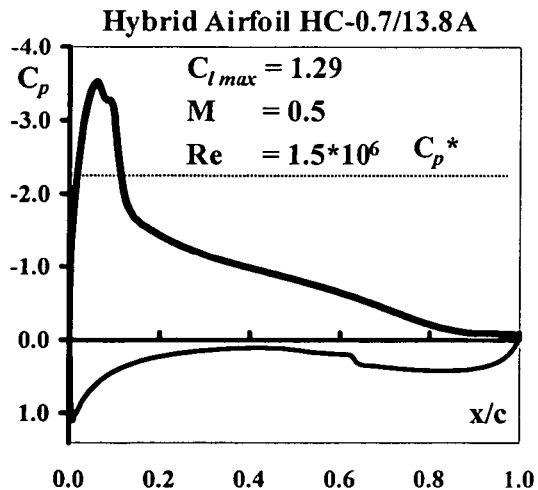

As demonstrated in these examples, hybrid airfoils according to the invention can provide an improvement of subsonic maximum lift relative to a transonic reference airfoil, while retaining acceptable transonic characteristics. This is especially evident at medium transonic Mach numbers as illustrated in FIG. 16(a) (Re=1.5*10$^6$). FIG. 16(b) illustrates improvements obtained in lift coefficient for a range of angle of attack as the camber is increased from that of hybrid airfoil HC-0.7/13.8A to that of hybrid airfoil HC-0.7/13.9B. An enhancement of maximum lift of hybrid airfoils may be attributed to delay of formation of suction peak at the leading edge of hybrid airfoils at subsonic Mach numbers and resulting delay of formation of shock waves at medium transonic Mach numbers, as illustrated in FIGS. 17(a) to 18(b).

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed exemplary embodiments in accordance with the invention, it will be appreciated that many changes may be made therein without departing from the spirit of the invention.

The invention claimed is:

1. A hybrid aerofoil configured for a wing of an aircraft, the hybrid aerofoil being profiled for transonic and subsonic flight conditions of the wing and having a respective transonic design point and a respective subsonic design point, said aerofoil comprising a leading edge, a trailing edge and a chord dimension therebetween, and comprising:
an upstream portion having an upstream profile characteristic of subsonic aerofoils including a relatively rounded leading edge, wherein said upstream profile is configured for reducing a magnitude of a suction peak and retarding development of trailing edge flow separation at said subsonic design point including subsonic high lift coefficient flight conditions as compared with that obtained with a reference transonic aerofoil having a relatively sharp leading edge, and comprising a camber greater than 1% of said chord dimension at a position less than about 30% along said chord from said leading edge at said transonic and subsonic flight conditions, and a camber greater than 2% at a position greater than 60% along said chord from said leading edge; and
a downstream portion including a mid-portion having a mid-portion profile characteristic of transonic aerofoils, wherein said mid-portion profile is shaped for delaying formation of shockwaves and minimizing wave drag at said transonic design point including transonic Mach numbers,
wherein said camber has a non-negative camber distribution with respect to the chord,
wherein said camber distribution comprises maxima at a position greater than 60% of said chord from said leading edge, and
wherein said upstream portion comprises a leading edge radius of greater than 2.5% of said chord dimension at said subsonic design point and at said transonic design point.

2. The aerofoil according to claim 1, wherein the aerofoil comprises a leading edge radius larger than that of said reference transonic aerofoil.

3. The aerofoil according to claim 1, wherein said camber is greater than 1% of said chord dimension between 5% and 30% of said chord dimension from a leading edge thereof.

4. The aerofoil according to claim 1, wherein said camber is substantially less than 5% of said chord dimension between 30% and 60% of said chord from said leading edge.

5. The aerofoil according to claim 1, wherein said camber is substantially more than 2% of said chord dimension between 30% and 60% of said chord from said leading edge.

6. The aerofoil according to claim 1, wherein the aerofoil comprises a thickness thicker than said reference transonic aerofoil at chord locations between 1% of said chord dimension and 5% of said chord from a leading edge thereof.

7. The aerofoil according to claim 1, wherein the aerofoil comprises a camber distribution that is intermediate with respect to that obtained with said reference transonic aerofoil and that obtained with a reference subsonic aerofoil, said reference subsonic aerofoil being configured having a similar thickness/chord ratio as said hybrid aerofoil.

8. The aerofoil according to claim 1, wherein said mid-portion is defined between from 25% and 60% along said chord from the leading edge.

9. The aerofoil according to claim 1, wherein said aerofoil comprises an area distribution along said chord, and wherein said aerofoil comprises a location of maximum thickness thereof, such that to allow a portion of the aerofoil downstream of said maximum thickness location for turbulent pressure recovery.

10. The aerofoil according to claim 1, said aerofoil defining a continuous geometric enclosure extending between a leading edge and a trialing edge thereof, for at least one flight condition.

11. A wing for an air vehicle having the aerofoil as defined in claim 1.

12. The aerofoil according to claim 1, wherein said camber is greater than 2% of said chord dimension at a position less than 30% along said chord from said leading edge at transonic and subsonic flight conditions.

13. The aerofoil according to claim 1, wherein said camber is greater than 1% of said chord dimension at a position less than 20% along said chord from said leading edge at transonic and subsonic flight conditions.

14. The aerofoil according to claim 1, wherein said maxima is the maximum value of camber in said camber distribution.

15. The aerofoil according to claim 1, wherein said camber distribution comprises additional maxima at a position less than 60% of said chord from said leading edge.

16. The aerofoil according to claim 15, wherein said additional maxima has a camber value that is less than the camber value of the first-mentioned maxima.

17. The aerofoil according to claim 1, wherein said downstream portion includes an aft portion shaped for controlling aerofoil lift and pitching moment.

18. The aerofoil according to claim 17, wherein said aft portion is defined between 60% and 100% along said chord of the aerofoil from the leading edge.

19. A hybrid aerofoil configured for a wing of an aircraft, the hybrid aerofoil being profiled for transonic and subsonic flight conditions of the wing and having a respective transonic design point and a respective subsonic design point, said aerofoil comprising a leading edge, a trailing edge and a chord dimension therebetween, and comprising:
an upstream portion having an upstream profile characteristic of subsonic aerofoils including a relatively rounded leading edge, wherein said upstream profile is configured for reducing a magnitude of a suction peak and retarding development of trailing edge flow separation at said subsonic design point including subsonic high lift coefficient flight conditions as compared with that obtained with a reference transonic aerofoil having a relatively sharper leading edge, and comprising a camber greater than 1% of said chord dimension at a position less than 30% along said chord from said leading edge at said transonic and subsonic flight conditions, and a chamber greater than 2% at a position greater than 60% along said chord from said leading edge; and
a downstream portion including a mid-portion having a mid-portion profile characteristic of transonic aerofoils, wherein said mid-portion profile is shaped for delaying formation of shockwaves and minimizing wave drag at said transonic design point including transonic Mach numbers,
wherein said aerofoil has a smooth cross-sectional distribution having a maximum thickness value at a mid-portion of said aerofoil greater than 30% of said chord from said leading edge,
wherein said camber has a non-negative camber distribution with respect to the chord,
wherein said camber distribution comprises maxima at a position greater than 60% of said chord from said leading edge, and
wherein said upstream portion comprises a leading edge radius of greater than 2.5% of said chord dimensions at said subsonic design point and said transonic design point.

20. A hybrid aerofoil configured for a wing of an aircraft, the hybrid aerofoil being profiled for transonic and subsonic flight conditions and having a respective transonic design point and a respective subsonic design point, comprising:
an upstream portion having a profile including a relatively rounded leading edge radius, configured for providing subsonic-like aerodynamic performance to reduce a magnitude of a suction peak and retard development of trailing edge flow separation at said subsonic design point including subsonic high lift coefficient flight conditions as compared with that obtained with a reference transonic aerofoil having a relatively pointed leading edge radius; and
a downstream portion including a mid-portion having a profile configured for providing transonic-like aerodynamic performance to delay formation of shockwaves and minimize wave drag at said transonic design point including transonic Mach numbers,
wherein said aerofoil comprises a camber having a non-negative camber distribution with respect to the chord,
wherein said camber distribution comprises first maxima that is greater than 2% at a position not less than 60% of said chord from said leading edge, and second maxima that is greater than 1% at a position less than 60% of said chord from said leading edge; and
wherein said upstream portion comprises a leading edge radius of greater than 2.5% of said chord dimension at said subsonic design point and at said transonic design point.

21. The aerofoil according to claim 20, wherein the aerofoil is configured for providing a pressure distribution at a transonic design point thereof that is more favorable than that obtained with a reference subsonic aerofoil, at said transonic design point.

22. The aerofoil according to claim 20, wherein the aerofoil is configured for providing a pressure distribution at a subsonic design point that is more favorable than that obtained with said reference transonic aerofoil at said subsonic design point, said reference transonic aerofoil being configured having a similar thickness/chord ratio as said hybrid aerofoil.

23. A wing for an air vehicle having the aerofoil as defined in claim 20.

24. A method for profiling an aerofoil for a wing of an aircraft, the hybrid aerofoil being optimized for transonic and subsonic flight conditions having a respective transonic design point and a subsonic design point, comprising:
(a) profiling an upstream portion thereof in a manner including providing a relatively rounded leading edge to provide the aerofoil with subsonic-like performance at a subsonic design point to reduce a magnitude of a suction peak and retarding development of trailing edge flow separation at said subsonic design point including subsonic high lift coefficient flight conditions as compared with that obtained with a reference transonic aerofoil having a relatively pointed leading edge;
(b) concurrently profiling a downstream portion thereof in a manner to provide the aerofoil with transonic-like performance at a transonic design point to delay formation of shockwaves and minimizing wave drag at said transonic design point including transonic Mach numbers;
(c) providing a camber having a non-negative camber distribution with respect to the chord, wherein said camber distribution comprises maxima at a position not less than 60% of said chord from said leading edge, and further comprises a camber value greater than 1% of said chord dimension at a position less than 30% along said chord from said leading edge and a camber value greater than 2% of said chord dimension at a position greater than 60% along said chord from said leading edge; and wherein said upstream portion comprises a leading edge radius of greater than 2.5% of said chord dimension at said subsonic design point and at said transonic design point.

25. The method according to claim 24, wherein step (b) comprises providing a smooth cross-sectional distribution for the aerofoil having a maximum value at a mid-portion of said aerofoil greater than 30% of a dimension of chord of said aerofoil from a leading edge thereof.

26. The method according to claim 24, wherein steps (a) and (b) are applied to a starting aerodynamic profile obtained for a reference subsonic aerofoil, said reference subsonic aerofoil being configured having a similar thickness/chord ratio as said hybrid aerofoil.

27. The method according to claim 24, wherein steps (a) and (b) are applied to a starting aerodynamic profile obtained for said reference transonic aerofoil.

28. The method according to claim 24, wherein step (a) comprises generating a camber greater than 1% of said chord dimension at a position less than 30% along said chord from said leading edge.

* * * * *